Patented Nov. 18, 1930

1,782,186

UNITED STATES PATENT OFFICE

GENE ABSON, OF CHICAGO, ILLINOIS, ASSIGNOR TO CHICAGO PAVING LABORATORY, INC., OF CHICAGO, ILLINOIS, A CORPORATION OF ILLINOIS

ASPHALTIC MATERIAL AND PROCESS FOR MANUFACTURE

No Drawing. Continuation of application Serial No. 252,945, filed February 8, 1928. This application filed October 25, 1929. Serial No. 402,548.

This application is a continuation of my former application, Serial No. 252,945, filed February 8, 1928.

In the refining of petroleum for the preparation of asphalts or asphaltic materials, it is quite common to introduce air into the bottom of a still containing asphaltic or semi-asphaltic residuum, or non-asphaltic base, at elevated temperatures and gradually harden the residuum by oxidation or polymerization of the various constituent hydrocarbons; this is commercially known as the "air blowing" method. Such manipulation produces an asphaltic residue of varying degrees of hardness (known technically as "penetration"), dependent obviously upon the length of time the air is allowed to act, the source or kind of residuum employed and, to a lesser extent, upon the temperatures used; also, there is always produced, concomitant lowering of susceptibility to temperature changes, lessening of ductility, and increase in melting point, all as compared with straight, or steam, or vacuum refining, which latter methods produce hardening by distillation only.

The "blowing" method is of vital importance in the asphalt industry in the production of vast amounts of asphalt for use in prepared roofings, fillers for block pavements, electrical insulating compounds, rubber manufacture, molded articles such as battery containers, electrical appliances, telephone parts, etcetera, as well as mastic floorings, water-proofing materials and a wide variety of other uses.

In the present accepted method of air blowing or oxidation, it is a general truth that for a given melting point a certain resulting penetration will always and inevitably follow with a given type of residuum; the only variation which might be found would be in blending different types of residuum, but still the relationship would always be constant for a given condition. For example, with a straight Mexican residuum of, say 200 penetration @ 77 degrees F., as commonly used in the manufacture of roof coating, with air blowing maintained at about 450 degrees F., the resulting penetration for 220 degrees F. melting point will always be under 20.

This comparison can be drawn for any melting point-penetration relationship and is always constant for a given residuum. With residuum derived from other kinds of crude, the relationship is not the same, but nevertheless is always constant. In the preparation of molded articles, the analogy would be drawn at say 275 degrees F. melting point with a much lower (that is, harder) penetration. The fact is that the limitation of the present known methods used are such as to require the use of high melting point asphalts which are known to be so hard in penetration as to be undesirably brittle and, vice versa, a low melting point is oftentimes used in order to relieve brittleness, with its attendant disadvantages of susceptibility to flowing at higher temperatures. In some instances, blending of residua from different crudes is resorted to but always at a sacrifice of desirable advantages. As a typical example, in the production of roof coating, Mexican fluxes are blended with Mid-Continent fluxes but the use or the latter is limited to an amount which will not cause staining by capillary fractionation and, obviously, at any distance from the Mid-Continent source of supply, the use of this residuum is prohibitive on account of expense of transportation.

I am aware that in the past numerous claims have been made for the use of oxidizing agents to be used either alone or in combination with air. None of these seek (nor inadvertently do accomplish) the results with which this present application deals, namely, the manufacture of asphaltic materials of considerably less brittleness, that is to say, with a higher melting point relationship for a given penetration, or conversely, with a much softer penetration for a given melting point.

I have found that by the introduction of small quantities (often less than 1%) of the chlorides of zinc or iron, copper or antimony, as well as the sulphates and carbonates of these metals and others, in the regular process of air blowing or oxidation, the reaction is changed and accelerated to a remarkable extent, both in the melting point-penetration relationship of the finished product and in the time required for completion. Presumably, the reaction which takes place upon the introduction of any of these salts is a combination of both catalysis and a condensation or polymerization of the various constituent hydrocarbon molecules, since neither the salt nor the air can be used alone with nearly as great effectiveness.

As an illustration of the relationship in time saving occasioned by the process, I can cite one of many tests, as follows: Starting with the usual asphalt base residuum used in the manufacture of roofing coating, I find that in the identical equipment of stills, etcetera, the time is reduced from 7½ hours straight air blowing to 2 hours or less, for a given melting point of 215 degrees F. Obviously, such saving in time is important to the refiner in reducing costs materially and at the same time the quality of the product is enhanced for roofing purposes as shown by carrying the above illustration further: For the 215 degrees F. melting point I find in regular refinery air blowing a resulting penetration of 16 to 18 in 7½ hours, whereas, in the example above, the penetration at the end of less than 2 hours was 27 to 29 or much over 50% increase in penetration or decrease in brittleness. By varying the percentages of the salts, the penetration-melting point relationship can be controlled at will so the example given must be used for illustration only, and not construed as a limitation in any way. In the preparation of asphalt for, say, battery cases or other molded products where 275 degrees F. melting point material is required, the usual product has a penetration of around 10; with my process it is very easy to obtain a 100% increase in penetration for the same melting point with not over 1% of added salt, although some types of crude may require somewhat larger amounts.

As a concrete example and showing the use of a particular salt in varying proportions with one particular type of residuum, I quote the following random test run:

Starting with a residuum of a penetration of 260 at 77 degrees F., refined from Mexican crude petroleum with air introduced at approximately 425 degrees F. with and without the accelerating chemical salt, as follows:

| Proportion of sale | Total time air blowing— hrs. | Penetration @ 77° F. | Melting point |
|---|---|---|---|
| No added chemical | 8 | 16 | 233 degs. F. |
| 1% zinc chloride | 4 | 24 | 233 degs. F. |
| 2% zinc chloride | 2½ | 31 | 233 degs. F. |

Inspection of the above table readily reveals the tremendous saving in time and increase in penetration with corresponding decrease in brittleness or conversely, increase in malleability, for a given melting point.

With other salts and other residua, for example 155 penetration residuum refined from a blend of Mexican and South American crudes, treated with iron chloride, the relationships are as follows:

| Proportion of salt | Total time air blowing— hrs. | Penetration @ 77° F. | Melting point |
|---|---|---|---|
| No added chemical | 8½ | 14 | 228 degs. F. |
| ¼% iron chloride | 3½ | 21 | 228 degs. F. |
| ½% iron chloride | 2¼ | 24 | 228 degs. F. |
| 1% iron chloride | 1½ | 27 | 228 degs. F. |

It is understood that the above references are illustrative only and must not in any way be construed as limitations of the invention.

While the above shown examples employ not over 2% of added metallic salts, there are some other salts or some other types of residuum which would require larger amounts but in no case would the amount of salt required probably ever exceed 10%; likewise, while the minimum shown above is ¼%, there are conditions under which considerably less could be effectively used.

The only limitation of the effective chemical salts or proportions which I can use would be the ones which are non-volatile at blowing temperatures which are usually 400° F. and upwards, and ones which would have a tendency to produce lighter hydrocarbons by cracking. An undesirable material would be one such as aluminum chloride or the like.

The cost of the salt used will be substantially offset or balanced by the saving in time occasioned by its use, with the production of a vastly superior product; in addition to the decrease in brittleness referred to before, the asphaltic material so produced is much more resistant to atmospheric oxidation, aging or the deteriorating effect of water and sunlight, that is, it is much more stable.

It will be obvious that, in the operation of this process, instead of blowing with air, I might use any oxygen carrying gas, oxygen itself or ozone; also the operation may be of the batch type or may be one in which the air blowing is continuous. Likewise, the addition of the accelerating chemical is applicable to steam or vacuum distillation, particularly in the production of such types of asphalt in which it has been found to be expeditious to use a combination, separately or successively, of both air blowing and steam or vacuum distillation. It will be apparent that the accelerating salt may be added at the refinery during the process of refining and that this pretreated residuum may then be air blown or refined in any other way, at any time later. In short, various modifications or combinations of the methods used in the present art of refining or manufacturing asphalts may be used in combination with the addition of the afore-mentioned metallic salts.

As emphasizing the importance of the saving in time accuring to the present invention, it may be pointed out that this time saving should be considered as an economical advantage, particularly in the investment in plant equipment, for instance, the capacity of each still or battery would be doubled, or tripled, or even quadrupled relative to former processes without increase in investment. This means not only a very substantial saving in initial expenses and in operation expenses, but is a great advantage in permitting an increase in output to cover seasonal fluctuations without increasing the number of stills or batteries. In addition, the increased output of equipment in now existing plants would permit material expansion of business without the necessity of installing additional expensive equipment. Moreover, the cost of replacement will be distributed over double, triple or even quadruple the number of tons or barrels produced by present processes.

Whenever the terms "melting point" and "penetration" are used above, reference is always made to the Standards of the American Society for Testing Materials in accordance, respectively, to "D—36—26: Test for Softening Point of Bituminous Materials (Ring and Ball Method)", and "D—5—25: Test for Penetration of Bituminous Materials."

By the term "residuum" is meant any residue of distillation which may be used in the production of asphalt; also such naturally occurring asphaltic materials which have been produced by natural processes of thickening.

I claim as my invention:

1. The process of treating petroleum residuum in the conversion thereof to blown asphalt having a higher penetration for a given melting point than can be obtained from the same residuum without treatment, which comprises incorporating with said residuum a relatively small quantity of an inorganic non-alkaline earth metallic salt which is non-volatile at blowing temperatures, said salt being in insufficient amount to effect cracking of the residuum at blowing temperatures, and subjecting the residuum to air blowing while in a heated condition.

2. The process of treating petroleum residuum in the conversion thereof to blown asphalt having a higher melting point for a given penetration than can be obtained from the same residuum without treatment, which comprises incorporating with said residuum a relatively small quantity of an inorganic non-alkaline earth metallic salt which is non-volatile at blowing temperatures, said salt being in insufficient amount to effect cracking of the residuum at blowing temperatures, and subjecting the residuum to air blowing while in a heated condition.

3. The process of treating petroleum residuum in the conversion thereof to blown asphalt having a higher penetration for a given melting point than can be obtained from the same residuum without treatment and simultaneously accelerating said conversion, which comprises incorporating with said residuum a relatively small quantity of a condensation agent comprising an inorganic metallic salt which is non-volatile at blowing temperatures, said salt being in insufficient amount to effect cracking of the residuum at blowing temperatures, and subjecting the residuum to air blowing while in a heated condition.

4. The process of treating petroleum residuum in the conversion thereof to blown asphalt having a higher melting point for a given penetration than can be obtained from the same residuum without treatment and simultaneously accelerating said conversion, which comprises incorporating with said residuum a relatively small quantity of a condensation agent comprising an inorganic metallic salt which is non-volatile at blowing temperatures, said salt being in insufficient amount to effect cracking of the residuum at blowing temperatures, and subjecting the residuum to air blowing while in a heated condition.

5. The process of treating petroleum residuum in the conversion thereof to blown asphalt having a higher penetration for a given melting point than can be obtained from the same residuum without treatment and simultaneously accelerating said conversion, which comprises incorporating with said residuum a relatively small quantity of a condensation agent comprising a metallic salt which is non-volatile at blowing temperatures, said salt being in insufficient amount to effect cracking of the residuum at blowing temperatures, and subjecting the residuum to air blowing while in a heated condition.

6. The process of treating petroleum residuum in the conversion thereof to blown asphalt having a higher melting point for a given penetration than can be obtained from the same residuum without treatment and simultaneously accelerating said conversion, which comprises incorporating with said residuum a relatively small quantity of a condensation agent comprising a metallic salt which is non-volatile at blowing temperature, said salt being in insufficient amount to effect cracking of the residuum at blowing temperatures, and subjecting the residuum to air blowing while in a heated condition.

7. The process of treating petroleum residuum in the conversion thereof to blown asphalt having a higher penetration for a given melting point and can be obtained from the same residuum without treatment while simultaneously accelerating said conversion, which comprises incorporating with said residuum a relatively small quantity less than ten percent relative to the residuum, of an inorganic non-alkaline earth metallic salt which is non-volatile at blowing temperatures, said salt being in insufficient amount to effect cracking of the residuum at blowing temperatures, and subjecting the residuum to air blowing while in a heated condition.

8. The process of treating petroleum residuum in the conversion thereof to blown asphalt having a higher melting point for a given penetration than can be obtained from the same residuum without treatment and simultaneously accelerating said conversion, which comprises incorporating with said residuum a relatively small quantity, less than ten percent relative to said residuum, of a condensation agent comprising a metallic salt which is non-volatile at blowing temperatures, said salt being in insufficient amount to effect cracking of the residuum at blowing temperatures, and subjecting the residuum to air blowing while in a heated condition.

9. In a process of converting petroleum residuum to blown asphalt by subjecting said residuum to air blowing while in a heated condition, the improvement which comprises incorporating with said residuum a condensation agent comprising a metallic salt which is non-volatile at blowing temperatures, said salt being in sufficient quantity to accelerate said conversion and produce a blown asphalt having a higher penetration for a given melting point than can be obtained from the same residuum without treatment and being in insufficient quantity to effect cracking of the residuum at blowing temperatures.

10. In a process of converting petroleum residuum to blown asphalt by subjecting said residuum to air blowing while in a heated condition, the improvement which comprises incorporating with said residuum a condensation agent comprising a metallic salt which is non-volatile at blowing temperatures, said salt being in sufficient quantity to accelerate said conversion and produce a blown asphalt having a higher melting point for a given penetration than can be obtained from the same residuum without treatment and being in insufficient quantity to effect cracking of the residuum at blowing temperatures.

In testimony whereof I affix my signature.

GENE ABSON.